Feb. 6, 1934.  E. C. HORTON ET AL  1,946,073
WIPER BLADE AND MOUNTING
Filed Dec. 9, 1929
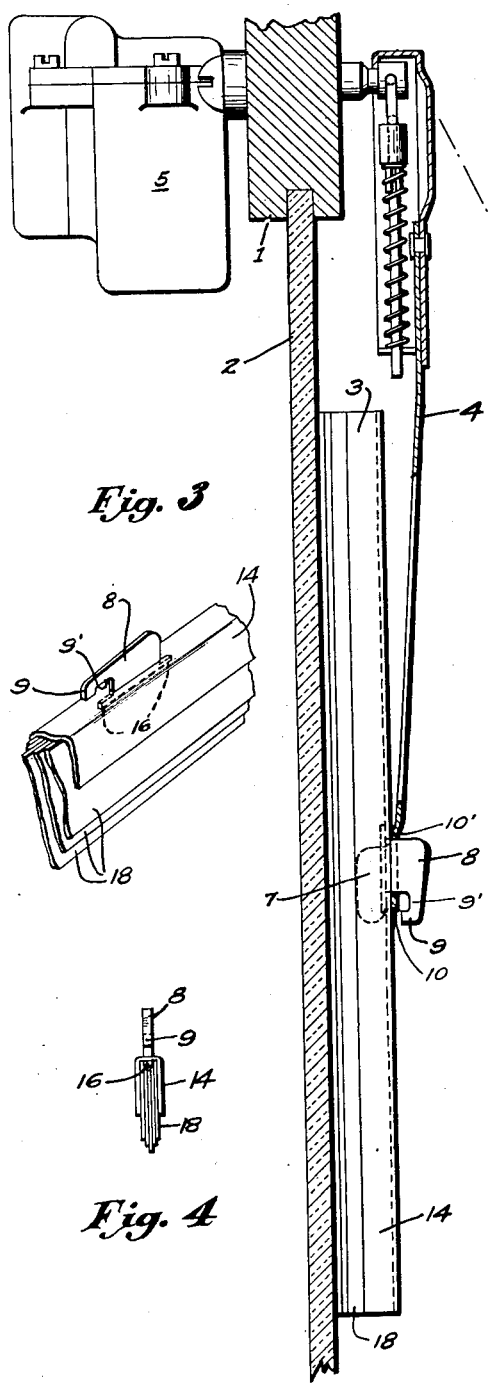
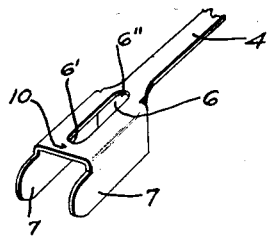
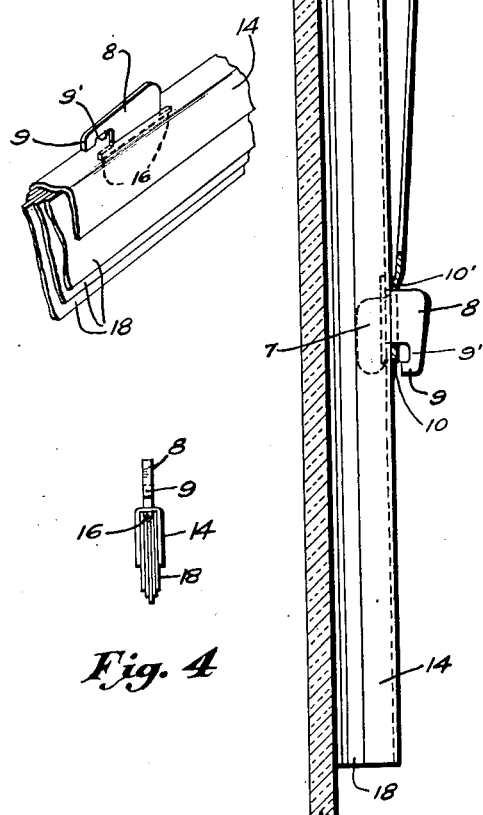
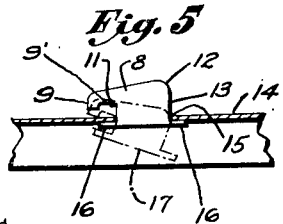
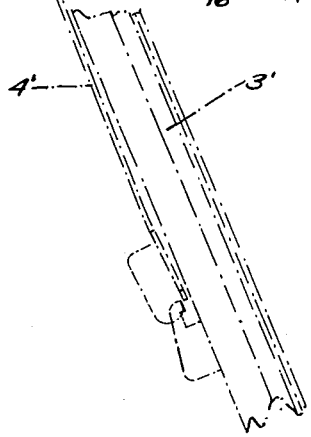
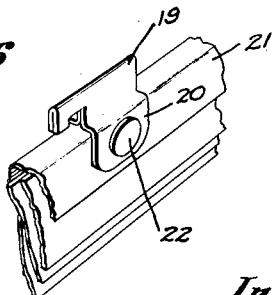
Inventors
Erwin C. Horton and
Henry Hueber
by Barton A. Bean Jr
Attorney Patented Feb. 6, 1934

1,946,073

UNITED STATES PATENT OFFICE 1,946,073

WIPER BLADE AND MOUNTING

Erwin C. Horton, Hamburg, and Henry Hueber, Buffalo, N. Y., assignors to Trico Products Corporation, Buffalo, N. Y.

Application December 9, 1929. Serial No. 412,813

22 Claims. (Cl. 15—250)

This invention relates to a mounting for wiper blades and has particular reference to the attachment of wiper blades to their supporting arms without the necessity of attaching screws or the use of tools.

Formerly the blades have been attached to their wiper-carrying arms by means of screws or bolts which very soon became rusted and would frequently break when repairing or replacing the blade, thereby necessitating the furnishing of an additional attaching element, and sometimes requiring the substitution of a new arm and blade assembly in its entirety. Attempts have been made to provide a readily attachable wiper blade, and toolless mountings have been devised and utilized which have proven more or less satisfactory but have also embodied an objectionable degree of flexibility or play in order to provide for the required and much desired flopping action in the blade mounting.

The present invention aims to provide a detachable wiper mounting in which the blade may readily be mounted and replaced without the use of tools; and also to provide a readily attachable mounting in which the wiper blade is supported firmly while permitting of the required flopping action.

The invention further resides in the construction of the blade with an improved attaching part, for providing for the detachable mounting thereof, and in the arrangements and combinations of parts hereinafter more fully described and claimed, reference being had to the accompanying drawing wherein, Fig. 1 is a fragmentary sectional view through a windshield equipped with a windshield cleaner showing the present invention in side elevation.

Fig. 2 is a fragmentary perspective view showing the wiper carrying end of the cleaner arm.

Fig. 3 is a similar view showing the cooperating part of the wiper blade.

Fig. 4 is an end elevation of the blade.

Fig. 5 is a fragmentary sectional view illustrating the manner of assembly of the mounting part in the wiper blade construction.

Fig. 6 is a fragmentary perspective view of a slightly modified embodiment of the invention.

Proceeding in accordance with the present invention the numeral 1 designates the windshield having its glass 2 acted upon by the wiper blade 3 which is carried by the wiper arm 4, the latter being in turn driven by a suitable means such as a motor 5. The wiper blade and arm are formed with interlocking or interengaging parts which permit the ready attachment and replacement of the blade as well as providing for the desired degree of limited angular movement resulting in the well known "flopping" action to thereby insure the blade assuming the proper wiping angle with respect to the glass 2.

In the preferred arrangement the wiper end of the arm 4 is provided with a seat having a slot 6 extending lengthwise of the arm, and depending from the marginal portions thereof is a pair of flop-determining parts or ears 7, forming with the seat a saddle formation which is substantially U-shaped in cross section with the slot 6 being formed in the inverted base thereof.

The wiper blade 3 is formed with a part adapted to interlock with the seat and freely fits between the ears 7 so that the latter will serve to determine the degree of flop or angular displacement of the blade about the interlock as the approximate pivoting point. The key or fin 8 which is carried by the blade in the present disclosure is formed with an overhanging lip or hook 9, and in attaching the blade to the wiper arm the latter is swung outwardly to the dotted line position as indicated at 4', the blade inverted and disposed at the outer side of the arm, as indicated at 3', and the hook 9 inserted upwardly between the ears 7, so that the free end portion of the arm 4 beyond the slot 6, indicated as 10 in Fig. 2, will pass between the hook 9 and the back of the blade. The hook will then overlie the slot 6 and upon swinging the blade about the lower end of the arm in a plane substantially perpendicular to the windshield glass the hook will freely enter the slot 6 followed by the body portion 8, and the lower end 6' of the slot will serve as a fulcrum on which the edge 11 of the attaching element 8 will pivot. In this respect it will be noted that the opposite corner 12, which is slightly higher than the pivoting edge 11, is rounded so that when the blade is pivoting about the approximate point 11 said corner will pass upwardly beyond the upper end 6'' of the slot so that the entire body portion 8 will be received by the slot 6 whereupon the tension on the arm 4 will cause the slot to ride downwardly toward the base of the attaching element 8. It is preferred that the seat portion be slightly offset to the plane of the arm 4 so that, upon applying the assembly described to a windshield the end portions 10 and 10' adjacent the said slot will impinge upon the back of the wiper blade under pressure of the arm 4 to form a bearing connection. The attachment is thus completed and it will be observed that the said end portions and the associated back portion of the blade will form a pivot and bearing assembly maintained by the attaching element 8 which projects a sufficient distance through the slot 6 so as to prevent accidental displacement. The hook 9 prevents the attaching element from becoming displaced from the slot 6 except by a relative movement between the parts of 180°, while the upper edge, indicated at 13, is lengthened so that any movement of the blade away from the glass will not displace the blade from its arm, and the blade can not be detached without swinging the arm 4 outwardly to an abnormal position and then swinging the wiper blade about the lower end of the arm in a plane perpendicular to the glass for approximately 180°, a reversal of the steps required in mounting the blade.

In this connection it will be noted that the hook 9 overhangs the free extremity of the arm 4 and is undercut at 9' to more or less freely receive the end portion 10. This supplemental interlock between the arm and the attaching element or fin 8 secures the blade to the arm against accidental displacement during such time as when the arm might be swung upwardly a short distance to permit of the windshield glass being cleaned. It will be noted that the length of the end portion 10 is greater than the distance between the lip of the hook 9 and the adjacent portion of the wiper. Such proportions insure against accidental displacement of the wiper under any condition except the aforementioned sliding entry or exit, indicated in dotted lines in Fig. 1.

The attaching element 8 may assume different forms but its preferred form is illustrated in Fig. 5 from which it will be noted that it may readily be stamped out of sheet metal without any further bending or setting operations. Furthermore, this particular form of attaching element may be readily united with the blade without attaching screws or rivets. Thus, it will be noted from said view, that there is provided in the back of the blade, through the channel or metal holder 14, a slot indicated at 15 through which is inserted, from beneath, the attaching element 8, the latter being provided with oppositely extending base flanges 16 for holding the element against pulling outwardly. The dotted showing 17 illustrates the manner of introducing the attaching element through the slot 15. After the wiping plies 18 are clamped within the channeled holder 14 the attaching element will be secured firmly in position against either inward or outward displacement.

The modified showing of the attaching element 19 in Fig. 6 comprises a blank struck from sheet metal and bent upon itself to form the body portion and has one or more attaching flanges 20 laterally offset from the body portion for straddling the metal holder 21. The flanges 20 and the blade are then perforated to receive a fastening rivet or screw 22.

As will be seen from a comparison of Figs. 2 and 3, the width of the slot 6 of the arm 4 is greater than the thickness of the attaching element 8 and the ears 7 of the arm are spaced a greater distance than the width of the blade holder channel 14, so that the blade is permitted to have the "flopping" motion, well known in this art, at the terminal positions during its reciprocation over the windshield surface, the blade "flopping" from contact with one ear 7 at the commencement of each stroke to contact with the other ear 7.

What is claimed is:

1. A wiper mounting for windshield cleaners comprising a blade carrying arm having a seat therein with laterally disposed ears on opposite sides thereof, a wiper blade having an attaching element projecting from the back thereof and interlocked with the seat of said arm, said blade loosely fitting between said ears for alternate engagement therewith during reciprocation of the arm whereby the ears will determine the angular relation of the blade with the windshield glass.

2. A wiper mounting comprising a blade carrying arm and a wiper blade, the arm having a longitudinal slot and the blade having a fin projecting from its back for interlocking with the slot of the arm, the slot being of width greater than the thickness of the fin to allow limited angular movement of the blade relative to the arm.

3. A wiper mounting comprising a blade carrying arm having a longitudinal slot therein, a wiper blade having an attaching part projecting from its back, said part being received by the arm slot and having a hook overhanging the adjacent end of the arm.

4. A wiper mounting comprising a blade carrying arm member and a wiper blade member, one of said members having a longitudinal slot and the other of said members having an attaching part received in the slot and formed with an overhanging projection for interlocking with said member having said longitudinal slot.

5. A wiper mounting comprising a blade carrying arm member and a wiper blade member, one of said members having a longitudinal slot, an attaching element carried by the other of said members and received in the slot of said slotted member, said attaching element having an overhanging part undercut to receive interlockingly a portion of the slotted member lying adjacent to the slot.

6. A wiper mounting comprising a blade carrying arm having a longitudinal slot in its outer end flanked by marginal ears, a wiper blade having an attaching element projecting from its back for being received by the arm slot, said element having a part overhanging the adjacent extremity of the arm and being undecut for receiving said extremity.

7. A wiper mounting comprising a blade carrying arm having a flat seat at its free extremity, a blade having a portion of its back edge contacting with said seat for pivotal movement relative thereto about an axis substantially parallel to said contacting edge, means for preventing displacement of said portion from said seat, and means for limiting the pivotal movement of said blade.

8. A wiper mounting comprising a blade carrying arm having at one end thereof a seat with a longitudinal slot, a blade having a portion of the back edge thereof contacting with said seat, a projection on said back edge of said blade extending into said slot for loose engagement therein to allow angular movement between said blade and arm, and means on said arm for limiting said angular movement about an axis substantially parallel with said elongated slot.

9. A wiper mounting comprising a blade carrying arm having a flat slotted seat at its free extremity, and having depending ears connected to the sides thereof, and a blade having a portion of its back edge contacting with said seat and adapted for pivoting action thereon, said portion having a projecting key portion for loose engagement in the slotted portion of said seat, said ears depending over the sides of said blade to limit the arcuate movement thereof.

10. A wiper mounting comprising a blade carrying arm having a slotted portion, a wiper blade having a back with a projecting fin, said fin having its base substantially equal in length to the slot of said arm portion and fitting into the same, one end of the fin having a hook overhanging the arm with a portion of the arm interposed between the hook and the back of the blade, the opposite end of the fin being curved to permit the arm portion passing over the same when pivoting about the portion immediately beneath the hook, said slotted portion being flanked on opposite sides by parts for limiting angular movement of the wiper blade relative to the blade carrying arm.

11. A wiper blade for mounting in a wiper carrying arm formed with a slotted portion, comprising a channeled holder, a wiping member secured in the channel of the holder, said holder having a slot in its back, and a blade attaching fin projecting through the holder slot and having an enlarged base within the holder channel secured against displacement between the wiping member therein and the back of the holder, said fin being engageable with the slotted portion of the wiper carrying arm.

12. A cleaning blade for mounting on a wiper carrying arm having a slotted portion, comprising a channeled holder, an attaching fin projecting from the back of the holder between the planes of the sides of the holder, said fin having a part overhanging the holder in spaced relation thereto for interlocking with the slotted portion of the wiper carrying arm, and a wiping member secured within the channel of the holder.

13. A cleaning blade for a wiper carrying arm having a slotted portion, comprising a holder, a wiping member supported thereby, an attaching element carried by the blade, said element having offset flanges seating on and straddling the holder, and means securing the flanges to the sides of the holder, said element projecting from the back of the holder and having a part overhanging the back of the holder in spaced relation thereto for interlocking with the slotted portion of the carrying arm.

14. A cleaning blade for a wiper carrying arm having a slotted portion, comprising a holder, a wiping member supported thereby, an attaching element carried by the blade and having a portion engageable in the arm slot, said element formed of a single piece of sheet metal bent upon itself along an edge disposed beyond the holder to form the body of the element and having its opposite ends relatively offset to straddle the holder and overlie the opposite sides thereof, and means for securing the offset ends to the opposite sides of the holder.

15. A cleaning blade for a wiper carrying arm having a slotted portion, comprising a channeled holder, a wiper member supported thereby, an attaching element carried by the blade, said element having portions extending over the back and a side of said holder and secured to the said side, and said element having a portion projecting outwardly from the back of the channeled holder in a plane substantially paralleling and between the planes of the sides of said holder for engagement with the slotted portion of the wiper carrying arm.

16. In a windshield wiper, the combination with a wiping element holder, of a clip mounted thereon and having a portion extending laterally from said holder, a supporting arm having a slot adapted to receive said portion of the clip, and a keeper carried by said portion and cooperable with said arm in a manner to retain the laterally extending portion against accidental displacement from said slot.

17. In a windshield wiper, the combination with a wiping element holder having an aperture formed therein, of a clip having leg portions at opposite sides of said holder and having a fin extending laterally from the holder, means cooperable with said aperture for securing said clip to said holder, a supporting arm having a slot formed therein adapted to receive said fin, and a keeper carried by said fin and cooperable with said arm for securing said fin against displacement from said slot.

18. In a windshield wiper, the combination with a wiping element holder having an aperture formed therein, of a clip having apertured leg portions at opposite sides of said holder and having a fin extending laterally from the holder, means cooperable with the aperture formed in said holder and the apertures in the leg portions for securing said clip to said holder, a supporting arm having a slot formed therein adapted to receive said fin, and a keeper formed on said fin and projecting over the supporting arm for securing the fin against accidental displacement from said slot.

19. In a windshield wiper, the combination with a wiping element holder, of clip means including means for attachment to said holder, and said clip means having a portion extending laterally from said holder, and a supporting arm having a channel including a web and side flanges formed therein, and said channel having a slot in the web thereof adapted to receive loosely said portion in a manner to permit a rocking movement thereof, the side flanges of said channel being co-operable with said clip means for limiting the rocking movement of said clip means in said slot.

20. Clip means for attaching a windshield wiper blade to an arm having a channel shaped portion, the web of said portion having a slot, said means comprising a single piece of metal bent upon itself to provide a pair of legs constituting a body, said means having an integral fin projecting from the body and adapted to extend through said slot, and portions of said legs being spaced to receive between them the wiper blade, and means coacting with the spaced portions of the legs for retaining the blade between said spaced portions.

21. In a windshield wiper, the combination with a wiping element having a portion extending laterally therefrom, a supporting arm having a slot adapted to receive said portion, said portion carrying a keeper part which is insertible through the slot and cooperable with said arm in a manner to retain the laterally extending portion against accidental displacement from the arm slot.

22. In a windshield wiper, the combination with a wiping element having fin-like means extending laterally therefrom, a supporting arm having an elongated slot adapted to receive said fin-like means, and a keeper carried by said fin-like means and overhanging the outer edges of the arm slot for cooperating with said arm in a manner to retain the laterally extending fin-like means against accidental displacement from said arm slot.

ERWIN C. HORTON.
HENRY HUEBER.